(12) United States Patent
Yamanaka et al.

(10) Patent No.: US 7,851,699 B2
(45) Date of Patent: Dec. 14, 2010

(54) DYE-SENSITIZED SOLAR CELL AND DYE-SENSITIZED SOLAR CELL MODULE

(75) Inventors: Ryohsuke Yamanaka, Gojo (JP); Liyuan Han, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 942 days.

(21) Appl. No.: 11/099,564

(22) Filed: Apr. 6, 2005

(65) Prior Publication Data

US 2005/0257826 A1 Nov. 24, 2005

Related U.S. Application Data (63) Continuation of application No. PCT/JP03/12805, filed on Oct. 6, 2003.

(30) Foreign Application Priority Data

Oct. 15, 2002 (JP) .............................. 2002-300801

(51) Int. Cl.
  *H01L 31/00* (2006.01)
  *H01L 27/142* (2006.01)
  *H01L 21/02* (2006.01)
  *H01M 10/36* (2010.01)

(52) U.S. Cl. ..................... 136/256; 136/252; 136/263; 136/244; 438/62; 438/66; 438/80; 438/85; 429/111

(58) Field of Classification Search .................. 136/263, 136/256, 252, 244; 429/111; 438/62, 66, 438/80, 85

See application file for complete search history.

(56) References Cited

U.S. PATENT DOCUMENTS

| | | | | |
|---|---|---|---|---|
| 4,257,156 A | * | 3/1981 | Houston | 438/122 |
| 4,260,429 A | * | 4/1981 | Moyer | 136/256 |
| 4,365,107 A | * | 12/1982 | Yamauchi | 136/258 |
| 4,385,102 A | * | 5/1983 | Fitzky et al. | 429/111 |
| 4,754,544 A | * | 7/1988 | Hanak | 438/66 |
| 4,759,951 A | * | 7/1988 | Itoh et al. | 427/76 |
| 4,927,721 A | * | 5/1990 | Gratzel et al. | 429/111 |
| 5,084,365 A | * | 1/1992 | Gratzel et al. | 429/111 |
| 5,538,902 A | * | 7/1996 | Izu et al. | 438/66 |
| 5,593,901 A | * | 1/1997 | Oswald et al. | 438/80 |
| 5,639,314 A | * | 6/1997 | Kura et al. | 136/244 |

(Continued)

FOREIGN PATENT DOCUMENTS

JP  53-54494  4/1978

(Continued)

OTHER PUBLICATIONS

English Translation of International Preliminary Examination Report mailed Apr. 21, 2005 in corresponding PCT Application No. PCT/JP2003/012805.

*Primary Examiner*—Alexa D Neckel
*Assistant Examiner*—Golam Mowla
(74) *Attorney, Agent, or Firm*—Nixon & Vanderhye P.C.

(57) ABSTRACT

A dye-sensitized solar cell comprising a first support, a first conductive layer, a porous photovoltaic layer containing a dye, a carrier transport layer and a second conductive layer stacked in this order, wherein the length of contact side of the porous photovoltaic layer closed to the first conductive layer is different from that of its confronted side of the porous photovoltaic layer.

23 Claims, 5 Drawing Sheets

U.S. PATENT DOCUMENTS

| | | | |
|---|---|---|---|
| 6,043,428 A * | 3/2000 | Han et al. | 136/263 |
| 6,069,313 A * | 5/2000 | Kay | 136/249 |
| 6,291,763 B1 * | 9/2001 | Nakamura | 136/256 |
| 6,300,559 B1 * | 10/2001 | Ohmori | 136/263 |
| 6,469,243 B2 * | 10/2002 | Yamanaka et al. | 136/263 |
| 6,479,745 B2 * | 11/2002 | Yamanaka et al. | 136/263 |
| 6,538,194 B1 * | 3/2003 | Koyanagi et al. | 136/263 |
| 6,652,904 B1 * | 11/2003 | Phani et al. | 427/74 |
| 7,145,071 B2 * | 12/2006 | Spivack et al. | 136/263 |
| 2001/0032665 A1 * | 10/2001 | Han et al. | 136/256 |
| 2004/0112421 A1 * | 6/2004 | Spivack et al. | 136/256 |
| 2010/0012166 A1 * | 1/2010 | Yamanaka et al. | 136/244 |
| 2010/0071743 A1 * | 3/2010 | Yamanaka et al. | 136/244 |

FOREIGN PATENT DOCUMENTS

| | | | |
|---|---|---|---|
| JP | 57-148862 | | 9/1982 |
| JP | 05-013733 A | * | 1/1993 |
| JP | 5-504023 | | 6/1993 |
| JP | 05-175527 A | * | 7/1993 |
| JP | 06-204544 A | * | 7/1994 |
| JP | 2664194 | | 6/1997 |
| JP | 11-168230 | | 6/1999 |
| JP | 11-288745 | | 10/1999 |
| JP | 11-514787 | | 12/1999 |
| JP | 2000-91609 | | 3/2000 |
| JP | 2000-285976 | | 10/2000 |
| JP | 2001-357897 | | 12/2001 |
| JP | 2002-93475 | | 3/2002 |
| WO | 97/16838 A1 | | 5/1997 |
| WO | WO-99/63614 A | * | 12/1999 |

* cited by examiner

DYE-SENSITIZED SOLAR CELL AND DYE-SENSITIZED SOLAR CELL MODULE

CROSS-REFERENCES TO RELATED APPLICATIONS

This application is a continuation of International Application No. PCT/JP2003/012805 filed on Oct. 6, 2003 on which the priority of Japanese patent application No. 2002-300801 filed on Oct. 15, 2002 is claimed, disclosures of said applications being incorporated by reference in their entirety.

TECHNICAL FIELD

The technical field relates to a dye-sensitized solar cell and a dye-sensitized solar cell module.

BACKGROUND ART

A solar cell capable of converting sunlight into electric power has been noted as an energy source substituting for fossil fuel. Currently, examples of a solar cell, which began to be partially put to practical use, include a solar cell employing a crystalline silicon substrate, and a thin-film silicon solar cell. However, the former has a problem in high manufacturing costs of a silicon substrate, and the latter has a problem in that it is necessary to employ various kinds of semiconductor gases and complicated devices. Therefore, it is still high in manufacturing costs. Thus, an effort to reduce costs per output of electric power generation by achieving a high efficiency of photoelectric conversion has been made in both of the solar cells, but the above-mentioned problems have not been solved yet.

A dye-sensitized solar cell applying photoinduced electron transfer of metal complex has been shown as a new type of solar cell in Japanese Kohyo Patent Publication No. HEI 5(1993)-504023 and Japanese Patent No. 2664194. This dye-sensitized solar cell has a structure in that a photovoltaic layer is constituted between electrodes formed on each of two glass substrates by using a photoelectric conversion material and an electrolyte material. This photoelectric conversion material tends to have absorption spectrum in a visible light region by adsorbing a photosensitized dye. In this solar cell, the irradiation of light on the porous photovoltaic layer generates electrons, which are transferred to the electrode through an external electric circuit. The electrons transferred to the electrode are conveyed by ions in an electrolyte and returned to the porous photovoltaic layer via the opposite electrode. Electric energy is thus produced in such a manner.

A technique of a low-cost manufacturing method on the basis of this principle of operation is described in Japanese Unexamined Patent Publication No. 2000-91609, which technique is outlined. First, a glass substrate on which a transparent conductive film (electrode) is formed is prepared. A platinum conductive film (electrode) and a titanium dioxide colloid power-generating layer are formed on another windable flexible substrate to obtain a multilayer body. When or after this multilayer body is formed, the power-generating layer is impregnated with an electrolytic solution. It is conceived that this technique allows a single-unit organic solar cell.

Meanwhile, a dye-sensitized solar cell module, wherein plural dye-sensitized solar cells are connected in series, is shown in International Publication No. WO97/16838. Specifically, an individual dye-sensitized solar cell has a structure in that a titanium oxide layer, a porous insulating layer and a counter electrode are sequentially laminated on a glass substrate on which a transparent conductive film (electrode) subjected to patterning in the shape of a strip is formed. Also, a conductive layer of one dye-sensitized solar cell is disposed so as to contact with a counter electrode of an adjacent dye-sensitized solar cell, thereby allowing both of the solar cells to be connected in series.

However, the dye-sensitized solar cells described in Japanese Kohyo Patent Publication No. HEI 5(1993)-504023 and Japanese Patent No. 2664194 have the following basic structure: an electrolytic solution is injected between two glass substrates with a constant gap retained therebetween to make up the dye-sensitized solar cell. Accordingly, even though a solar cell with a small area can be experimentally manufactured, the application to a solar cell with a large area such as 1 meter square becomes difficult. With regard to such a solar cell, an enlargement in the area of one solar cell (unit cell) increases generated current in proportion to the area.

Then, a resistance component in a lateral direction of a transparent conductive film to be used for an electrode portion is extremely increased and, consequently, internal series electrical resistance as a solar cell is increased. As a result, there arises a problem in that a curve factor (fill factor; FF) in current-voltage characteristics during photoelectric conversion is decreased and photoelectric conversion efficiency is decreased.

It is conceived that the use of a flexible substrate allows high-speed production in Japanese Unexamined Patent Publication No. 2000-91609. One solar cell (unit cell), however, is simply made larger in area, whereby there arises a problem in that an increase in internal series resistance makes difficult to achieve a large area in the same way as the above.

In order to solve these problems, an integrated structure is conceived such as to contact a first conductive layer of a rectangular unit cell with a second conductive layer of an adjacent unit cell, which structure is employed for an amorphous silicon solar cell module composed so that an amorphous silicon layer is held between the first and second conductive layers. With regard to this structure, however, adjacent photovoltaic layers need to be formed with a certain gap so as not to contact with each other. Generally, the conversion efficiency of an integrated solar cell module signifies generation efficiency per module area. Thus, a large area of a gap brings no contribution of light onto the gap to electric power generation, so that module conversion efficiency becomes poor even though the conversion efficiency of a unit cell composing the module is high. The manufacturing costs per unit output also tend to become high. A method of manufacturing the module needs to be developed for contracting a gap between adjacent unit cells.

Generally, the amorphous silicon solar cell is subjected to scribing and integrated patterning by laser or the like, which these processes are applied to a dye-sensitized solar cell with difficulty. The reason therefore is that a photovoltaic layer of a dye-sensitized solar cell comprises a porous body in order to adsorb more dyes. A minute pattern can not be formed by laser or the like on such a porous body for the reason that a portion on which a minute pattern is formed is poor in strength. In addition, use of the laser raises manufacturing costs.

Figure 5:
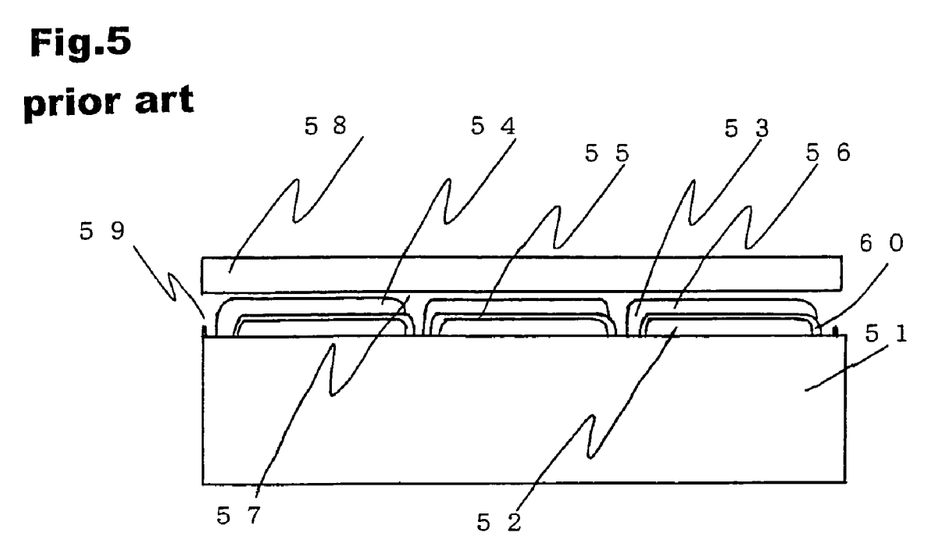
FIG. 5 is a schematic cross-sectional view of a dye-sensitized solar cell of the prior art.

In order to solve these problems, a porous photovoltaic layer is formed by using a screen printing process in such a manner as the solar cell described in International Publication No. WO97/16838 shown in FIG. 5. It is, however, impossible to form a shape shown in FIG. 5 only by the screen printing process, and after the porous photovoltaic layer is formed, patterning is performed by laser, air jet or the like, so that the same problem arises for the same reason as the above. In FIG.

5, 51 denotes a transparent substrate, 52 denotes an intermediate layer, 53 and 57 denote gaps, 54 and 56 denote porous layers, 55 denotes an intermediate porous layer, 58 denotes a top cover for sealing electrical insulating liquid, and 59 and 60 denote terminals.

Further, the thickness of the porous photovoltaic layer in the dye-sensitized solar cell generally needs to be approximately 10 μm or more for adsorbing more dyes by a surface of an oxide semiconductor composing the porous photovoltaic layer. It is difficult that a second conductive layer is uniformly formed on the porous photovoltaic layer manufactured in the above-mentioned manufacturing method. For example, in the case where a second conductive layer of one unit cell is contacted with a first conductive layer of an adjacent unit cell, a decrease in the efficiency of the dye-sensitized solar cell results from an increase in resistance and, additionally, the occurrence of a short-circuit due to the extreme thinning of a second conductive layer on the side of a porous photovoltaic layer.

Meanwhile, a method is also conceived such that a resin or the like is printed with a predetermined pattern, which is utilized for forming a porous photovoltaic layer and a second conductive layer; however, this method offers complicated operation processes, so that manufacturing tact is deteriorated and costs are raised.

SUMMARY

Through earnest studies in view of the above-mentioned problems, the inventors of the present invention found that the use of a shape appropriate for achieving high efficiency of a dye-sensitized solar cell allows the solar cell to be manufactured more easily than the conventional art, so as to further obtain a dye-sensitized solar cell having an increased photocurrent density and a high conversion efficiency, and a dye-sensitized solar cell module employing this.

Thus, an embodiment provides a dye-sensitized solar cell comprising a first support, a first conductive layer, a porous photovoltaic layer containing a dye, a carrier transport layer and a second conductive layer stacked in this order, wherein the length of contact side of the porous photovoltaic layer closed to the first conductive layer is different from that of its confronted side of the porous photovoltaic layer.

An embodiment provides a dye-sensitized solar cell module comprising a plurality of the above-mentioned dye-sensitized solar cells disposed, wherein the dye-sensitized solar cells are connected in series and integrated by contacting a first conductive layer of the dye-sensitized solar cell with a second conductive layer of another adjacent dye-sensitized solar cell.

These and other embodiments of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

EMBODIMENTS OF THE INVENTION

An embodiment of a dye-sensitized solar cell (hereinafter, also simply referred to as solar cell) comprises a first support, a first conductive layer, a porous photovoltaic layer containing a dye, a carrier transport layer, a second conductive layer and a second support stacked in this order. In addition, a length of contact side of the porous photovoltaic layer closed to the first conductive layer is different from that of its confronted side of the porous photovoltaic layer.

The length of contact side may be shorter or longer than the length of its confronted side as long as it is different from the length of its confronted side.

Figure 2A:
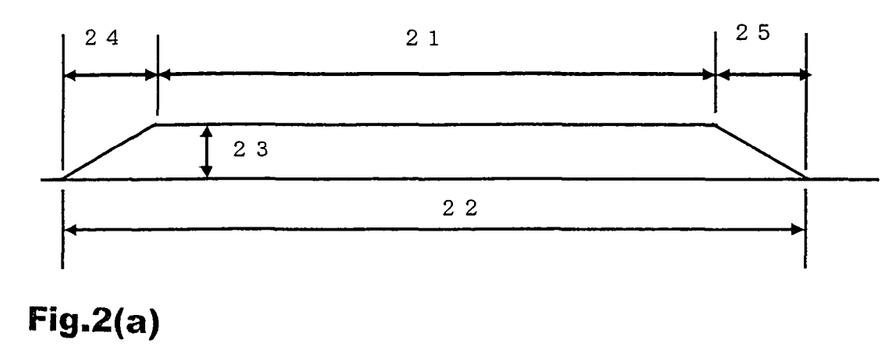
FIGS. 2(a) and 2(b) are cross-sectional views of a porous photovoltaic layer of a dye-sensitized solar cell of the embodiment.
Figure 2B:
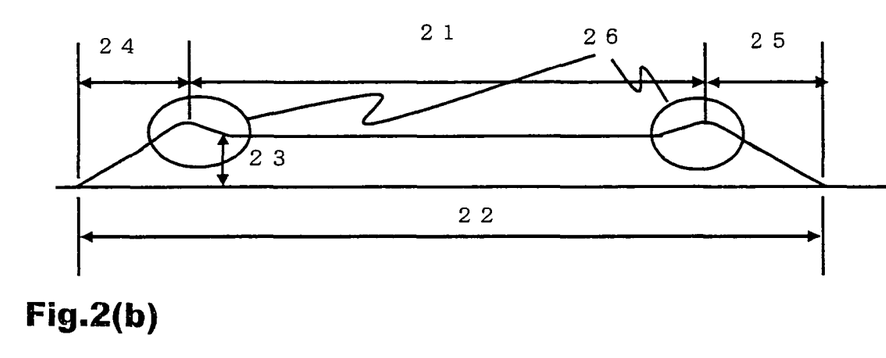

Here, the length of contact side of the porous photovoltaic layer closed to the first conductive layer and the length of confronted side are described by using FIGS. 2(a) and 2(b) showing a case where the length of confronted side is shorter than the length of contact side. FIG. 2(a) shows a cross-sectional view of the porous photovoltaic layer formed on the substrate. 21 denotes the length of confronted side, 22 denotes the length of contact side and 23 denotes a film thickness (Y). The shortest distance between a line of a perpendicularly drawn from a surface edge of the confronted side of the porous photovoltaic layer to the contact side of the porous photovoltaic layer and a surface edge of the contact side is 24 or 25, and a difference between the length of confronted side and the length of contact side means the sum of 24 and 25 in length.

The length of 24 or 25, which is a calculation standard of the shortest distance between the intersection of the perpendicularly drawn from the surface edge of the confronted side of the porous photovoltaic layer to the contact side of the porous photovoltaic layer and the surface edge of the contact side, is regarded as a distance from a point where the film thickness of 24 or 25 portion becomes smaller than a film thickness 23 to an end (24, 25 in FIG. 2(a)) of the porous photovoltaic layer. From one perspective, this can be viewed as a horizontal or lateral distance between where the contact side begins and where the confronted side begins. Within this portion, the thickness of the porous photovoltaic layer varies until the thickness reaches a maximum as seen in FIGS. 2(a) and 2(b). In the case where a distance is determined with difficulty by the above-mentioned process, such that the confronted side is inclined, it is preferred to determine by the following process.

The shortest distance between the intersection of the perpendicular drawn from the surface edge of the confronted side of the porous photovoltaic layer to the contact side of the porous photovoltaic layer and the surface edge of the contact side is calculated by using a point where the film thickness becomes smaller than the film thickness 23 on the basis of a line drawn in parallel with the porous photovoltaic layer on the basis of the film thickness 23 in the range of length equivalent to 60% of the length of contact side on the basis of the center portion of the length of contact side 22 of the porous photovoltaic layer.

The surface of the porous photovoltaic layer manufactured by screen printing or the like occasionally has irregularities, depending on manufacturing conditions. In this case, an average value of a film thickness in 21 of FIG. 2(a) is regarded as a film thickness. The shape of the porous photovoltaic layer shown in FIGS. 2(a) and 2(b) can be measured by using a probing type step-meter.

The porous photovoltaic layer manufactured by screen printing or the like occasionally exhibits a shape as shown in FIG. 2(b). In this case, a portion having the largest film thickness in 26 of FIG. 2(b) is regarded as a standard.

The shortest distance (24 or 25) between the intersection of the perpendicular drawn from the surface edge of the confronted side of the porous photovoltaic layer to the contact side of the porous photovoltaic layer and the surface edge of the contact side is preferably 50 μm or more. It is not preferable that the length of less than 50 μm deteriorates the effect of improving conversion efficiency. A difference between the length of contact side and the length of its confronted side is more preferably 100 to 800 μm.

With regard to the description, a dimensionless number K represented by the following formula (1):

$$K=Y/\sqrt{X^2+Y^2}$$

wherein X is the shortest distance between the intersection of the perpendicularly drawn from the surface edge of the confronted side of the porous photovoltaic layer to the contact side of the porous photovoltaic layer and the surface edge of the contact side, and Y is the thickness of the porous photovoltaic layer, is preferably 0.15 or less, more preferably 0.05 or less.

With regard to the dye-sensitized solar cell of the embodiment, each component thereof is hereinafter described.

The first support is a member capable of functionally supporting the porous photovoltaic layer from the stage of manufacturing to the stage of using products. The first support is preferably a support made of materials having light transmission properties and high heat resistance. It is, however, preferred that the first support substantially transmits light with a wavelength having an effective sensitivity to at least the aftermentioned dye-sensitized, which first support is not necessarily required to have transmission properties of all light.

Examples of the materials for the first support include glasses such as soda glass, fused quartz glass and crystalline quartz glass, and heat-resistant resin boards such as a flexible film.

The support preferably has a thickness of approximately 0.2 to 5 mm and a heat resistance of 250° C. or more. Examples of such a support include glasses and flexible films.

Examples of the flexible film (hereinafter abbreviated to "film") include long-term weather-resistant sheets and films such as polyester, polyacryl, polyimide, polytetrafluoroethane (trade name: "Teflon"), polyethylene, polypropylene and PET. Above all, in accumulating a conductive layer, the film is heated to a temperature of approximately 200° C., and thereby is preferably made of Teflon having heat resistance at this temperature.

In addition, the support can be utilized for installing a completed dye-sensitized solar cell in another structure. That is to say, on the occasion of using a support such as glass, the periphery of glass can be easily installed in another support by using a metallic processed part and a screw.

The second support is not particularly limited. Specifically, the same support as the first support can be used therefore, and additionally the second support may not have heat resistance in the case of not performing the firing step after placing the second support. In the case where the side of the first support is regarded as a light-receptive surface of the solar cell, there is no problem even if the second support is opaque. In this case, the second support is desirably made of materials capable of reflecting incident light, such as metal, for effectively using incident light. In order to reduce the weight of the solar cell, it is desirable to use a film, preferably a laminated film of PET and aluminum from the viewpoint of strengthening moisture resistance.

When a film is used for the first or second support, the porous photovoltaic layer can be closely sealed with opposed first and second supports by a lamination process or the like, so that unnecessary gaps can be decreased.

The first conductive layer and the second conductive layer are composed so as to hold the porous photovoltaic layer and the carrier transport layer therebetween in the case of superposing the first support and the second support.

The first conductive layer can be formed on the first support, and the second conductive layer can be formed on the second support or a porous insulating layer (which will be described later). Examples of materials therefore include transparent conductive metallic oxides such as ITO (indium-tin composite oxide), tin oxide doped with fluorine, zinc oxide doped with boron, gallium or aluminum, and titanium oxide doped with niobium, gold, silver, aluminum, indium, platinum, and carbon (carbon black, graphite, glass carbon, amorphous carbon, hard carbon, soft carbon, carbon whisker, carbon nano-tube and fullerene).

For example, at least one of the first conductive layer and the second conductive layer is preferably made of transparent materials so as to allow light transmission. Examples of the transparent materials include tin oxide and a thin film of opaque materials (for example, a metallic material such as aluminum). It is, however, preferred that the transparent materials substantially transmit light with a wavelength having an effective sensitivity to at least a dye-sensitized (to be described later), which transparent materials do not necessarily need to have transmission properties of all light.

A conductive layer on the side of no necessity of light transmission properties does not need thin-film formation of opaque materials. Thus, platinum and various kinds of carbons can be manufactured with arbitrary film thickness from the viewpoint of electrical conductivity, and a mixture of platinum grains into the above-mentioned carbons can also be used.

The porous photovoltaic layer is composed of a semiconductor, whose shape is subject to various kinds such as particle-like and film-like, preferably a film-like shape. Examples of materials for the porous photovoltaic layer include one kind or a combination of two or more kinds of publicly known semiconductors such as titanium oxide, zinc oxide, tungstic oxide, barium titanate, strontium titanate and cadmium sulfide, among which titanium oxide or zinc oxide is preferable in view of conversion efficiency, stability and safety.

Various publicly-known processes can be used as a process of forming a film-like porous photovoltaic layer on the substrate, specifically including processes of applying and firing a suspension containing semiconductor particles on the substrate, such as a screen printing process and an ink-jet process. Among these, the screen printing process employing a suspension is preferable from the viewpoint of thick-film formation and manufacturing costs.

The film thickness of the porous photovoltaic layer on this occasion is not particularly limited but preferably approximately 0.5 to 40 μm from the viewpoint of transmission properties, conversion efficiency and the like. In addition, a dye (which will be described later) needs to be adsorbed more by the porous photovoltaic layer in order to improve conversion efficiency. For this reason, the film-like porous photovoltaic layer preferably has a large specific surface area, preferably approximately 10 to 400 m²/g. In the present specification, a specific surface area is a value measured by a BET adsorption process.

Examples of the above-mentioned semiconductor particles include particles of a single or compound semiconductor having an appropriate average particle diameter among commercially available products, for example, approximately 1 to 500 nm. In the present specification, an average particle diameter is a value measured by SEM observation.

Examples of a solvent to be used for suspending these semiconductor particles include a glyme solvent such as ethylene glycol monomethyl ether, an alcohol solvent such as isopropyl alcohol, a mixed solvent such as isopropyl alcohol/toluene and water.

The drying and firing of the above-mentioned porous photovoltaic layer are performed while properly adjusting the conditions of temperature, time, atmosphere and the like in accordance with kinds of a substrate and semiconductor particles to be used. Examples of such conditions include conditions under the air or the atmosphere of inert gas, in the range of approximately 50 to 800° C., and for approximately 10 seconds to 12 hours. These drying and firing can be performed once at a single temperature, or twice or more with temperature changed.

Examples of the dye, which is adsorbed by the porous photovoltaic layer to function as a photosensitizer, include a dye having absorption in various visible light regions and/or an infrared light region. In addition, a dye having in its molecule interlock groups such as a carboxylic group, a carboxylic anhydride group, an alkoxy group, a hydroxyl group, a hydroxyallyl group, a sulfonic group, an ester group, a mercapto group and a phosphonyl group is preferable for being firmly adsorbed by a porous photovoltaic layer. Among these, a carboxylic group and a carboxylic anhydride group are more preferable. The interlock groups provide electrical bond for facilitating electron transfer between a dye in an excited state and a conduction band of the porous photovoltaic layer.

Examples of the dye containing these interlock groups include a ruthenium dye, an azo dye, a quinone dye, a quinone imine dye, a quinacridone dye, a squalylium dye, a cyanine dye, a merocyanine dye, a triphenylmethane dye, a xanthene dye, a polyphylline dye, a phthalocyanine dye, a beryllene dye, an indigo dye, a naphthalocyanine dye and the like.

Examples of a method of manufacturing the porous photovoltaic layer adsorbing the dye include a method of immersing a porous photovoltaic layer formed on a conductive support in a solution (a solution for adsorbing a dye) in which the dye is dissolved.

It is preferred that the solvent for dissolving a dye is a solvent which dissolves a dye, specifically including alcohols such as ethanol, ketones such as acetone, ethers such as diethyl ether and tetrahydrofuran, nitrides such as acetonitrile, halogenated aliphatic hydrocarbon such as chloroform, aliphatic hydrocarbon such as hexane, aromatic hydrocarbon such as benzene, esters such as ethyl acetate and water. These solvents can also be used in a mixture of two kinds or more.

The dye concentration in a solution can be properly adjusted in accordance with kinds of a dye and a solvent to be used, which concentration is preferably as high as possible in order to improve an adsorption function, for example, $5 \times 10^{-4}$ mol/l or more.

The porous photovoltaic layer preferably has an inclined plane at an end in the periphery thereof.

The carrier transport layer filled between the porous photovoltaic layer and the second conductive layer is composed of conductive materials for transporting electron, hole and ion, and a solvent. Examples thereof include a hole transport material such as polycarbazole, an electron transport material such as tetranitrofluorenone, a conductive polymer such as polyol, ion conductors such as liquid electrolyte and polyelectrolyte, and p-type semiconductors such as copper iodide and copper thiocyanate.

Ion conductors are preferable among the above-mentioned conductive materials, and a liquid electrolyte containing a redox electrolyte is particularly preferable. Such a redox electrolyte is not particularly limited if it can generally be used for a cell, a solar cell and the like. Specifically, the following are preferable: a combination of metallic iodides such as LiI, NaI, KI and $CaI_2$, and iodine as well as a combination of metallic bromides such as LiBr, NaBr, KBr and $CaBr_2$, and bromine, among which a combination of LiI and iodine is preferable. An imidazole salt such as dimethylpropylimidazole iodide may further be mixed therewith.

Examples of a solvent include a carbonate compound such as propylene carbonate, a nitrile compound such as acetonitrile, alcohols such as ethanol, and additionally water and an aprotic polar substance, among which a carbonate compound and a nitrile compound are preferable. These solvents can also be used in a mixture of two kinds or more.

The concentration of conductive materials is preferably in the range of 0.01 to 1.5 mol/l, more preferably 0.01 to 0.8 mol/l.

The above-mentioned carrier transport layer may be formed as a solid carrier transport layer, which is formed in a porous insulating layer to be formed on a porous photovoltaic layer. In the case of using the solid carrier transport layer, the second conductive layer can be formed thereon; however, in the case of using liquid and a carrier transport layer containing liquid, it is difficult to form the second conductive layer thereon. In the latter case, the second conductive layer is formed on the second support as described above, and when a gap between adjacent unit cells becomes smaller, precision is required for superposing the second support on which the second conductive layer is formed. In such a case, the formation of the carrier transport layer in a porous insulating layer to be formed on the porous photovoltaic layer allows an integrated structure to be formed with a high precision.

There is no problem if materials for the porous insulating layer are insulating materials, including zirconium oxide, silicon oxide, aluminum oxide, boron oxide and the like. A manufacturing method thereof also does not particularly cause any problem if it can manufacture a shape not affecting carrier transport, for which method the same method as the method of forming the porous photovoltaic layer can be employed. In particular, a screen printing process is preferable as a process of applying a suspension containing particles comprising the above-mentioned insulating materials. The manufactured porous insulating layer is preferably high in reflectance and haze factor.

The description also provides a dye-sensitized solar cell module, which is characterized in that the above-mentioned dye-sensitized solar cells are connected in series and integrated by contacting the first conductive layer of the dye-sensitized solar cell with the second conductive layer of another adjacent dye-sensitized solar cell. Here, ends of the porous photovoltaic layers of adjacent dye-sensitized solar cells may not be parallel.

The technology is described more specifically by manufacturing examples, examples and comparative examples, and is not limited thereby. In the examples and comparative examples, a dye-sensitized solar cell is manufactured in accordance with the conditions of the manufacturing examples unless otherwise specified. (Manufacturing examples of dye-sensitized solar cell and dye-sensitized solar cell module employing this)

Figure 1:
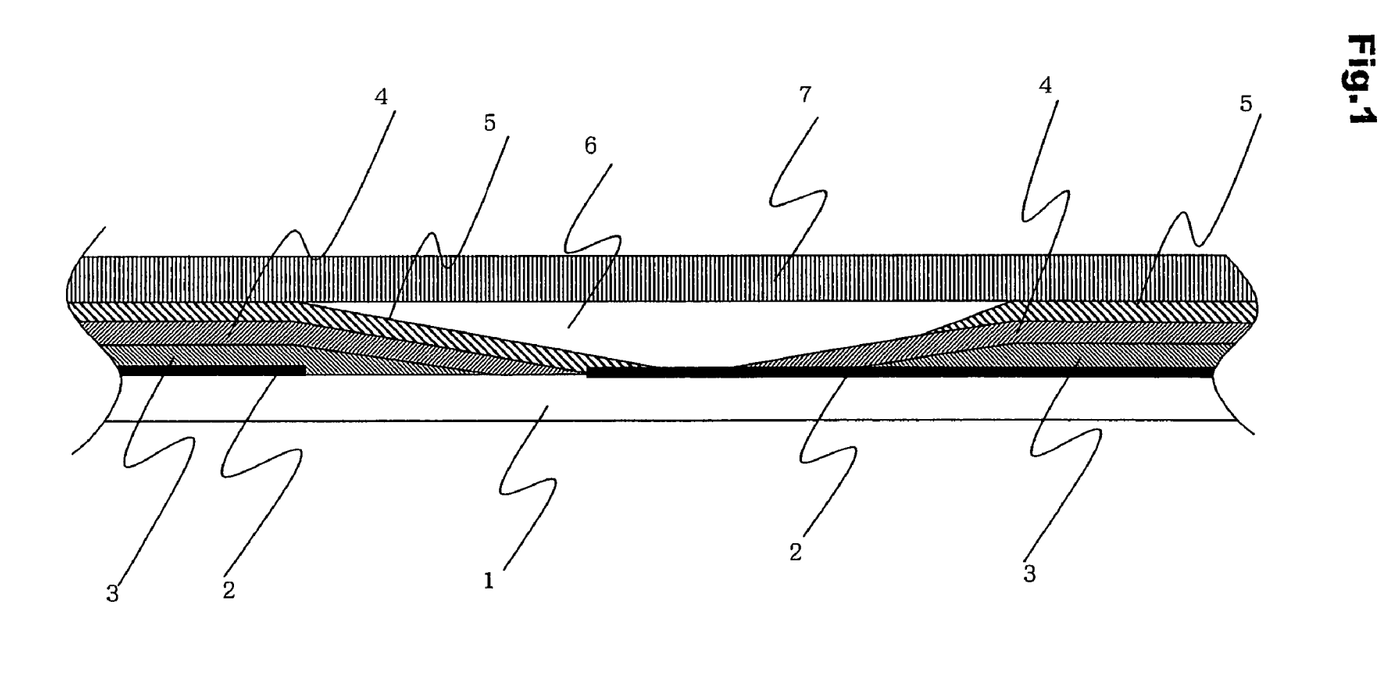
FIG. 1 is a schematic cross-sectional view of an integrated dye-sensitized solar cell module of an embodiment of the present invention.

FIG. 1 shows one example of a schematic cross-sectional view of a connecting portion in an integrated dye-sensitized solar cell (dye-sensitized solar cell module). In the figure, 1 denotes a first support, 2 denotes a first conductive layer (a set of 1 and 2 is simply referred to as substrate), 3 denotes a porous photovoltaic layer, 4 denotes a porous insulating layer in which a carrier transport layer is formed, 5 denotes a second conductive layer, 6 denotes an insulating layer, and 7 denotes a second support.

A method of manufacturing the dye-sensitized solar cell is specifically described hereinafter, and the following specific examples are merely exemplification and publicly known methods in the field can be adopted except for the following methods.

SnO$_2$ having a thickness of approximately 900 nm is formed into a film on one surface of the first support 1 made of glass having a thickness of approximately 3 mm to form the first conductive layer 2. The glass and SnO$_2$ have a heat resistance of 450° C. or more. The patterning of the first conductive layer 2 is preferably performed so that the first conductive layer 2 is partially contacted with the second conductive layer 5 (which will be described later) to connect plural unit cells in series. The removing operation of SnO$_2$ can be performed by irradiating and vaporizing SnO$_2$ with laser.

Next, a solvent and a binder are mixed with TiO$_2$ powders as a metallic oxide, which are changed to a slurry state or a paste state. This is subjected to screen printing in a predetermined position of the first conductive layer 2 by using a screen printing plate with patterning separately performed to manufacture the porous photovoltaic layer 3. Thereafter, the leveling of the porous photovoltaic layer 3 is performed and then dried in an oven at a temperature of 80° C.

Next, a solvent and the like are mixed with aluminum oxide powders, which are changed to a slurry state or a paste state to manufacture the porous insulating layer 4 in the same manner as the porous photovoltaic layer 3. In addition, the second conductive layer 5 is similarly manufactured by using carbon powders. Thereafter, each of the layers is sintered by firing in the air at a temperature of 450° C. The paste having viscosity such as to retain a layer structure even if applied in superposition is preferably used.

Next, the layers are immersed in a dye solution and adsorb the dye by refluxing for approximately 2 hours. Thereafter, a monomer for forming a polyelectrolyte is injected and polymerized at a temperature of 90° C. for 2 hours. The dye is adsorbed also by aluminum oxide; however, the adsorbed quantity thereof is not so large as to affect solar cell properties.

A laminated film of PET-aluminum-PET as the second support 7 is laminated at a temperature of approximately 100° C. by using an EVA (Ethyl Vinyl Acetate) sheet to thereby obtain an integrated dye-sensitized solar cell. In the case of using a polyelectrolyte, the polymerization may be performed after placing the second support 7 previous to polymerizing.

The porous photovoltaic layer 3 of the dye-sensitized solar cell manufactured by the above-mentioned processes was measured by a probing type step-meter and, consequently a film thickness Y was 15 μm, the shortest distance X between the intersection of the perpendicularly drawn from the surface edge of the confronted side of the porous photovoltaic layer to the contact side of the porous photovoltaic layer and the surface edge of the contact side was 200 μm, and a dimensionless number K was 0.075.

The influence on the performance of the dye-sensitized solar cell was examined by changing the above-mentioned ratio. First, a dye-sensitized solar cell, in which the porous photovoltaic layer 3 of 1 cm×1 cm (on the basis of facing surface length) has a shape such that the film thickness Y was 15 μm, the shortest distance X between the intersection of the perpendicularly drawn from the surface edge of the confronted side of the porous photovoltaic layer to the contact side of the porous photovoltaic layer and the surface edge of the contact side was 200 μm, and the dimensionless number K was 0.075, was manufactured by using the above-mentioned manufacturing processes.

In manufacturing a solar cell, materials and a manufacturing method to be employed are as follows.

As the substrate, used was a glass substrate (first support 1) of 15 mm×15 mm, manufactured by Nippon Sheet Glass Co., Ltd., with fluorine-doped SnO$_2$ (first conductive layer 2).

The porous photovoltaic layer 3 made of titanium oxide was manufactured using commercially available titanium oxide paste (trade name: D/SP, manufactured by Solaronix Co.) with a screen printing machine ("trade name: LS-150, manufactured by Newlong Machine Works, Ltd.").

As the material for the porous insulating layer 4, used was aluminum oxide to manufacture aluminum oxide paste in the following manner. First, aluminum oxide particles (diameter: 500 nm) were prepared and mixed with a surfactant (trade name: Triton-X, manufactured by Kishida Chemical Co., Ltd.), zirconia beads (diameter: 3 mm) and diethylene glycol monomethyl ether, and dispersed by a paint shaker to thereby prepare aluminum oxide paste. A weight mixing ratio was adjusted to an aluminum oxide concentration of 30% and a Triton-X concentration of 1%. The dispersing conditions were as follows: 100 g of zirconia beads were added to 40 ml of a solution and then the time for dispersing by a paint shaker was set to 2 hours.

As the material for the second conductive layer 5, used was carbon. Carbon paste was manufactured in the following manner. First, carbon particles were prepared and projected into a mixture of a PVDF polymer as a binder and n-methyl-2-pyrrolidone as a solvent, and dispersed by a kneader to thereby prepare carbon paste. A weight mixing ratio was a carbon concentration of 50% and a binder concentration of 10%, and the time for dispersing by a kneader was 2 hours.

As the dye, used was a ruthenium dye (trade name: Ruthenium535, λmax=540 nm, manufactured by Solaronix Co.) represented by the following structural formula. The dye of 4×10$^{-4}$ mol/l was dissolved in anhydrous ethanol to manufacture a dye solution for adsorbing, which solution and the laminated substrate obtained in the above were each put in a vessel and refluxed for approximately 30 minutes, so that the dye was adsorbed by the porous photovoltaic layer. Thereafter, the layer was washed in anhydrous ethanol several times and dried at a temperature of approximately 60° C. for approximately 20 minutes.

(1)

As the carrier transport layer, used was a polyelectrolyte layer. As an electrolytic solution in the polyelectrolyte layer, used was a solution in which 0.6 mol/l of dimethylpropylimidazolium iodide, 0.1 mol/l lithium iodide and 0.1 mol/l iodine were dissolved in a mixed solvent (a mixing ratio is γ-butyrolactone:ethylene carbonate=7:3 (volume ratio)) of γ-butyrolactone (manufactured by Kishida Chemical Co., Ltd.) and ethylene carbonate (manufactured by Kishida Chemical Co., Ltd.).

As the polymeric material, used was a compound obtained by the following synthesizing method 1 as Compound A and diethyltoluenediamine as Compound B (a mixing ratio is compound A:compound B=13:1 (weight ratio)).

(Synthesizing Method 1)

18 parts by weight of tolylene diisocyanate and 0.05 part by weight of dibutyltin dilaurate as a catalyst were added to 100 parts by weight of polytetramethylene glycol (trade name: PTMG2000, manufactured by Mitsubishi Chemical Corporation) in a reaction vessel and reacted at a temperature of 80° C. to manufacture Compound A having a molecular weight of 2350.

As the second support, used was a laminated film of PET-aluminum-PET.

The operating characteristics of the obtained dye-sensitized solar cell were examined under irradiation of AM1.5 artificial sunlight and, consequently, a short-circuit current density was 13.8 mA/cm$^2$, an open-circuit voltage value was 0.65 V, an FF was 0.64 and a conversion efficiency was 5.74%.

Next, a film thickness/length ratio attempted to be changed by modifying titanium oxide paste and printing conditions. The film thickness/length ratio can be adjusted by modifying viscosity coefficient, thixotropy properties and yield stress of titanium oxide, and screen printing conditions (screen mesh, screen emulsion thickness, gap (distance between a screen printing plate and a substrate), squeegee printing pressure, printing speed, printing temperature and humidity, leveling temperature and drying temperature). A combination of these conditions allowed film thickness/length ratios (constant film thickness: 15 μm) of 13 kinds in total to succeed in being manufactured.

Film thickness/length ratio can be manufactured by properly adjusting the conditions such as viscosity coefficient of 100000 to 15000000 cPs, screen mesh of 60 to 250 mesh, screen emulsion thickness of 10 to 40 μm, squeegee printing pressure of 1 to 6 kg, printing speed of 1 to 40 mm/sec, printing temperature of 15 to 35° C., leveling temperature of 15 to 80° C. and drying temperature of 15 to 80° C.

In manufacturing on the conditions of the viscosity coefficient of 10000000 cPs, the screen mesh of 70 mesh, the screen emulsion thickness of 20 μm, the squeegee printing pressure of 2.8 kg, the printing speed of 4 mm/s, the printing temperature, the leveling temperature and the drying temperature of 28° C., the dimensionless number K was 0.01 and the shortest distance X between the intersection of the perpendicularly drawn from the surface edge of the confronted side of the porous photovoltaic layer to the contact side of the porous photovoltaic layer and the surface edge of the contact side was 150 μm.

In manufacturing on the conditions of the viscosity coefficient of 15000000 cPs, the screen mesh of 100 mesh, the screen emulsion thickness of 20 μm, the squeegee printing pressure of 3.2 kg, the printing speed of 10 mm/s, the printing temperature of 30° C., the leveling temperature of 60° C. and the drying temperature of 28° C., the dimensionless number K was 0.075 and the shortest distance X between the intersection of the perpendicularly drawn from the surface edge of the confronted side of the porous photovoltaic layer to the contact side of the porous photovoltaic layer and the surface edge of the contact side was 200 μm.

A unit cell of the dye-sensitized solar cell was manufactured by using these porous photovoltaic layers 3, and the operating characteristics thereof were examined under irradiation of AM1.5 artificial sunlight. The results are shown in FIG. 3.

Generally, a decrease in the film thickness/length ratio tends to lengthen the base (24 or 25) of a triangle on the porous photovoltaic layer 3 cross section and to enlarge a light-receptive surface of the solar cell, so that the number of photons supplied to the solar cell is increased. The dye-sensitized solar cell, however, absorbs light and performs photoelectric conversion with the dye adsorbed by the porous photovoltaic layer 3, so that the length of contact side 22 of the porous photovoltaic layer 3 is lengthened. That is to say, it is conceived that the enlargement of a light-receptive surface increases incident light, while the photocurrent density of the total dye-sensitized solar cell is decreased with respect to a light-receptive surface.

Figure 3:
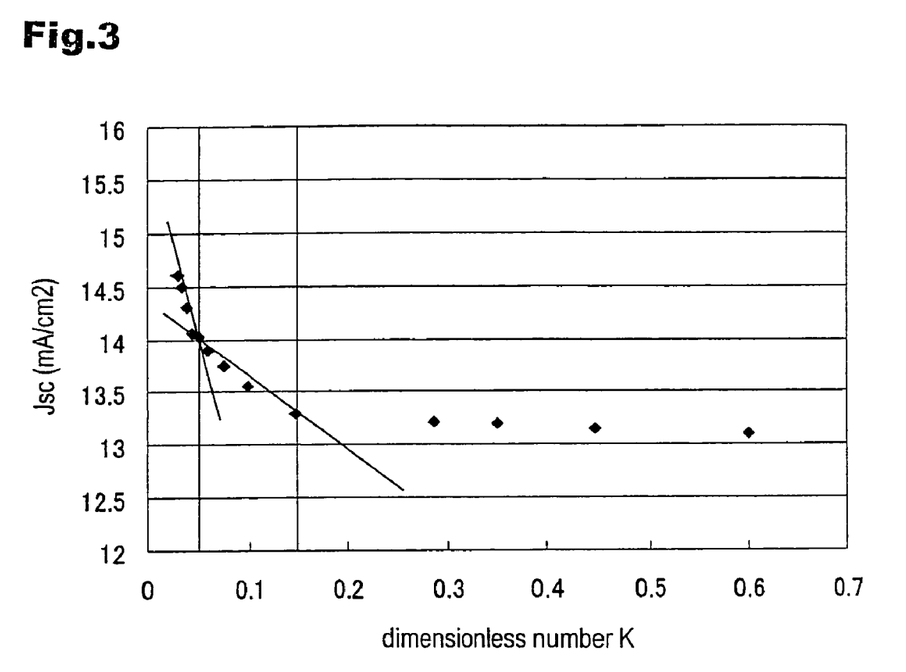
FIG. 3 is a view showing relation between a short-circuit current and a dimensionless number.

As shown in FIG. 3, however, short-circuit current density was increased while exhibiting behavior with an inflection point in the vicinity of the dimensionless number K of 0.15 or 0.05. The reason therefore is that the length in the inclined portion of the porous photovoltaic layer against the substrate is increased at the above-mentioned dimensionless number K to enlarge the contact area with the porous insulating layer. Consequently, an increase in reflection and scattering of light in the porous insulating layer allows the reuse of light, which has conventionally been incapable of being effectively utilized due to transmission, among the quantity of light from the light-receptive surface to the porous photovoltaic layer.

Generally, in the dye-sensitized solar cell, when the dimensionless number K becomes smaller, that is, a triangle becomes elongated, short-circuit current density Jsc ("light-receptive surface"="touching surface length 22"×"unit cell length") is decreased. The reason therefore is that the volume of the porous photovoltaic layer is decreased. More specifically, with regard to the dye-sensitized solar cell, unlike a silicon solar cell, photoelectric conversion is performed in a portion, in which a dye is adsorbed on one particle of titanium oxide, to obtain an electric current value by the multilayer and superposition thereof. Depending on the absorption wavelength range of the dye to be used, however, light can not completely be absorbed in each wavelength region but somewhat transmitted, and thus incident light can not completely be utilized. Nevertheless, a porous insulating layer being high in reflectance and haze factor as shown in FIG. 1 is provided by using a shape of the porous photovoltaic layer, whereby an increase in interface length between the porous photovoltaic layer and the porous insulating layer allows conventionally transmitted light to be effectively utilized, resulting in an improvement in Jsc.

When a cell in which the dimensionless number was 1, that is, the cross section of the porous photovoltaic layer 3 was a rectangle was manufactured, the short-circuit current density was 12.9 mA/cm$^2$, the open-circuit voltage value was 0.65 V, the FF was 0.65 and the conversion efficiency was 5.32%.

Figure 4:
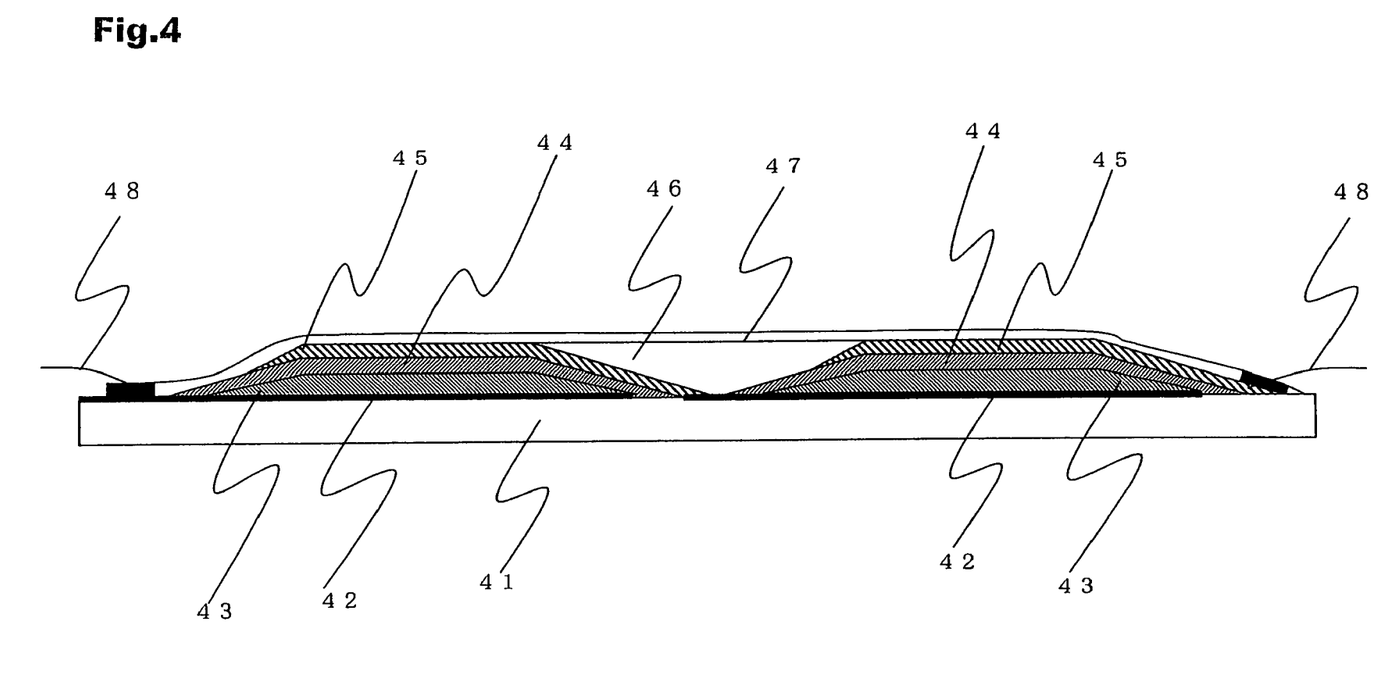
FIG. 4 is a cross-sectional view of a double-series dye-sensitized solar cell module.

Next, a double-series dye-sensitized solar cell module was manufactured to evaluate performance thereof. FIG. 4 shows a cross-sectional view of the double-series dye-sensitized solar cell module. In FIG. 4, 41 denotes a first support, 42 denotes a first conductive layer (a set of 41 and 42 is simply referred to as a substrate), 43 denotes a porous photovoltaic layer, 44 denotes a porous insulating layer in which a carrier transport layer is formed, 45 denotes a second conductive layer, 46 denotes an insulating layer, 47 denotes a second support and 48 denotes a takeoff electrode.

A glass substrate having an area of 15 mm×30 mm, manufactured by Nippon Sheet Glass Co., Ltd., with $SnO_2$ (first conductive layer 42) was prepared as a substrate, and an $SnO_2$ portion in the middle of a width of 30 mm was scribed with a width of approximately 350 μm to also remove a first conductive layer from a takeoff electrode of a second conductive layer, as shown in FIG. 4. A cell was manufactured in each $SnO_2$ region by the above-mentioned processes to manufacture a double-series dye-sensitized solar cell module such that adjacent first conductive layer 41 and second conductive layer 45 were contacted.

The performance was measured in the same manner as the above, and, consequently, a short-circuit current density was 13.10 mA/cm², an open-circuit voltage value was 1.25 V, an FF was 0.59 and a conversion efficiency was 4.83%.

On the other hand, when a double-series dye-sensitized solar cell module made of a cell such that a dimensionless number was 1, that is, edge rounding of the porous photovoltaic layer 3 was not provided was manufactured, the short-circuit current density was 12.3 mA/cm², the open-circuit voltage value was 1.27 V, the FF was 0.49 and the conversion efficiency was 3.83%, whereby it was confirmed that a shape of the present invention allowed the second conductive layer 5 to be easily formed and resistance component to be reduced.

Generally, the conversion efficiency of the solar cell module is calculated on the basis of a light-receptive surface, so that more areas except elements on the light-receptive surface decrease the conversion efficiency of the module. Thus, a gap between adjacent porous photovoltaic layers is preferably as small as possible. In the case of manufacturing a porous photovoltaic layer by screen printing, the shortest distance X between the intersection of the perpendicularly drawn from the surface edge of the confronted side of the porous photovoltaic layer to the contact side of the porous photovoltaic layer and the surface edge of the contact side can be adjusted by the state of paste to be used and manufacturing conditions, as described above. However, an area is calculated by using an effective area (a light-receptive area of a porous photovoltaic layer) in order to clarify performance change by the shape of the porous photovoltaic layer.

Example 1

An integrated dye-sensitized solar cell module was manufactured, such that 10 unit cells are connected in series. Manufacturing processes thereof are described below. A series connection portion is a structure shown in FIG. 1.

As a substrate, used was a glass substrate (first support 1) of 10 mm×10 mm, manufactured by Nippon Sheet Glass Co., Ltd., with fluorine-doped $SnO_2$ (first conductive layer 2). $SnO_2$ was irradiated with laser light (YAG laser, fundamental wavelength: 1.06 μm) so as to be in the shape of a strip having a width of 1.035 cm and a gap between adjacent unit cells of 350 μm, and then patterning was performed by vaporizing $SnO_2$.

Next, a porous photovoltaic layer 3 after firing was manufactured by a screen printing machine so that a shape was 1 cm×9 cm, a film thickness was 15 μm, the shortest distance X between the intersection of the perpendicularly drawn from the surface edge of the confronted side of the porous photovoltaic layer to the contact side of the porous photovoltaic layer and the surface edge of the contact side was 250 μm, and a dimensionless number K was 0.06. A patterning gap of a screen printing plate used for this printing was 1 mm. A precursor layer of the porous photovoltaic layer 3 was printed and thereafter subjected to leveling at room temperature for approximately 2 hours and subsequently drying in an oven at a temperature of approximately 80° C. for 30 minutes.

Thereafter, an aluminum oxide paste (for forming a porous insulating layer) and a carbon paste (for forming a second conductive layer) were subjected to screen printing so as to be a structure shown in FIG. 1. Thereafter, each of the layers was simultaneously sintered by firing at a temperature of approximately 450° C. for 1.5 hours in the atmosphere of oxygen to thereby form the porous photovoltaic layer 3, the porous insulating layer and the second conductive layer.

Next, a dye was adsorbed onto the porous photovoltaic layer 3 to thereafter form urethane resin into an insulating layer 6. In addition, a polyelectrolyte was formed in the porous photovoltaic layer 3 and a porous insulating layer 4 to place a second support 7 having a laminated structure of PET-aluminum-PET and thereby manufacture an integrated dye-sensitized solar cell module.

The dye-sensitized solar cell module manufactured by the above-mentioned processes had a structure in that 10 unit cells of 1 cm×9 cm are connected in series. The operating characteristics of this solar cell were examined under irradiation of AM1.5 artificial sunlight and, consequently, a short-circuit current density was 12.71 mA/cm², an open-circuit voltage value was 6.49 V, an FF was 0.54 and a module conversion efficiency was 4.45%.

Comparative Example 1

As a comparative example, masking was performed with a Teflon tape in a predetermined position so that a dimensionless number K defined by the present invention was 1 (film thickness: 15 μm), that is, the cross section of the porous photovoltaic layer 3 was a rectangle. Subsequently, a precursor layer of the porous photovoltaic layer 3 was formed by printing titanium oxide paste and thereafter dried in an oven at a temperature of approximately 80° C. for 30 minutes to peel off the Teflon tape and confirm a shape thereof, which was such that the dimensionless number was 1. Other processes were performed in conformance with Example 1.

The obtained dye-sensitized solar cell module had the short-circuit current density of 10.37 mA/cm², the open-circuit voltage value of 6.49 V, the FF of 0.50 and the module conversion efficiency of 3.37%.

Example 2

A dye-sensitized solar cell module having the porous photovoltaic layer 3 in which the dimensionless number K was 0.15 and the shortest distance X between the intersection of the perpendicularly drawn from the surface edge of the confronted side of the porous photovoltaic layer to the contact side of the porous photovoltaic layer and the surface edge of the contact side was 100 μm was manufactured in conformance with Example 1. The obtained dye-sensitized solar cell module had the short-circuit current density of 11.08 mA/cm², the open-circuit voltage value was 6.50 V, the FF of 0.53 and the module conversion efficiency of 3.82%.

Example 3

A dye-sensitized solar cell module having the porous photovoltaic layer 3 in which the dimensionless number K was 0.03, the shortest distance X between the intersection of the perpendicularly drawn from the surface edge of the confronted side of the porous photovoltaic layer to the contact side of the porous photovoltaic layer and the surface edge of the contact side was 330 μm, and the film thickness was 10 μm was manufactured in conformance with Example 1. The performance of the obtained dye-sensitized solar cell module offered the results shown in Table 1.

Example 4

A dye-sensitized solar cell module having the porous photovoltaic layer 3 in which the dimensionless number K was 0.07, the shortest distance X between the intersection of the perpendicularly drawn from the surface edge of the confronted side of the porous photovoltaic layer to the contact side of the porous photovoltaic layer and the surface edge of the contact side was 150 μm, and the film thickness was 10 μm was manufactured in conformance with Example 1. The performance of the obtained dye-sensitized solar cell module offered the results shown in Table 1.

Example 5

A dye-sensitized solar cell module having the porous photovoltaic layer 3 in which the dimensionless number K was 0.04, the shortest distance X between the intersection of the perpendicularly drawn from the surface edge of the confronted side of the porous photovoltaic layer to the contact side of the porous photovoltaic layer and the surface edge of the contact side was 500 μm, and the film thickness was 20 μm was manufactured in conformance with Example 1. The performance of the obtained dye-sensitized solar cell module offered the results shown in Table 1.

Example 6

A dye-sensitized solar cell module having the porous photovoltaic layer 3 in which the dimensionless number K was 0.10, the shortest distance X between the intersection of the perpendicularly drawn from the surface edge of the confronted side of the porous photovoltaic layer to the contact side of the porous photovoltaic layer and the surface edge of the contact side was 200 μm, and the film thickness was 20 μm was manufactured in conformance with Example 1. The performance of the obtained dye-sensitized solar cell module offered the results shown in Table 1.

Comparative Example 2

A dye-sensitized solar cell module having the porous photovoltaic layer 3 in which the dimensionless number K was 1 and the film thickness was 10 μm was manufactured in conformance with Comparative Example 1. The performance of the obtained dye-sensitized solar cell module offered the results shown in Table 1.

Comparative Example 3

A dye-sensitized solar cell module having the porous photovoltaic layer 3 in which the dimensionless number K was 1 and the film thickness was 20 μm was manufactured in conformance with Comparative Example 1. The performance of the obtained dye-sensitized solar cell module offered the results shown in Table 1.

TABLE 1

|  | Short-circuit current density (mA/cm$^2$) | Open-circuit voltage value (V) | FF | Conversion efficiency (%) |
| --- | --- | --- | --- | --- |
| Example 3 | 11.51 | 6.51 | 0.54 | 4.05 |
| Example 4 | 9.37 | 6.62 | 0.57 | 3.54 |
| Example 5 | 14.31 | 6.49 | 0.52 | 4.83 |
| Example 6 | 12.68 | 6.49 | 0.54 | 4.44 |
| Comparative Example 2 | 8.20 | 6.60 | 0.56 | 3.03 |
| Comparative Example 3 | 11.70 | 6.47 | 0.53 | 4.01 |

As described above, a composition of the present invention improved the conversion efficiency of the integrated dye-sensitized solar cell module in the examples even though the module is a small module of approximately 10 cm×10 cm. In addition, it was found that the module was an effective structure for achieving a large size of approximately 1 m×1 m for the reason that the conversion efficiency of the dye-sensitized solar cell as a unit cell was also improved.

The present invention allows a dye-sensitized solar cell and a dye-sensitized solar cell module employing this to be manufactured, which cell has an improved conversion efficiency than the conventional art, simple manufacturing processes, low costs and a high conversion efficiency.

What is claimed is:

1. A dye-sensitized solar cell, comprising:
a first support;
a first conductive layer;
a porous photovoltaic layer containing a dye;
a carrier transport layer; and
a second conductive layer stacked in this order,
wherein a length of a contact side of the porous photovoltaic layer adjacent to the first conductive layer is different from that of its confronted side of the porous photovoltaic layer opposite the side adjacent to the first conductive layer,
wherein the porous photovoltaic layer is provided with a non-vertical and non-horizontal inclined portion at each end thereof, which extends with substantially a constant incline from the confronted side to the contact side of the porous photovoltaic layer,
wherein the porous photovoltaic layer has a thickness that satisfies a condition in which a dimensionless number K represented by the formula:

$$K = Y/\sqrt{X^2 + Y^2},$$

is 0.15 or less, and
wherein X is a shortest distance between a line perpendicularly drawn from a surface edge of the confronted side of the porous photovoltaic layer to the contact side of the porous photovoltaic layer and a surface edge of the contact side, and Y is a thickness of the porous photovoltaic layer in between two surface edges of the confronted side.

2. A dye-sensitized solar cell, comprising:
a first support;
a first conductive layer;
a porous photovoltaic layer containing a dye;
a carrier transport layer; and
a second conductive layer stacked in this order,
wherein the a length of a contact side of the porous photovoltaic layer adjacent to the first conductive layer is different from that of its confronted side of the porous photovoltaic layer opposite the side adjacent to the first conductive layer, and wherein the porous photovoltaic layer has a thickness that satisfies a condition in which a dimensionless number K represented by the following formula (1):

$$K=Y/\sqrt{X^2+Y^2},$$

is 0.15 or less, wherein X is a shortest distance between a line perpendicularly drawn from a surface edge of the confronted side of the porous photovoltaic layer to the contact side of the porous photovoltaic layer and a surface edge of the contact side, and Y is a thickness of the porous photovoltaic layer in between two surface edges of the confronted side.

3. The dye-sensitized solar cell of claim 2, wherein the dimensionless number K is 0.05 or less.

4. The dye-sensitized solar cell of claim 2, wherein the porous photovoltaic layer is a layer formed by using a screen printing process.

5. A dye-sensitized solar cell module comprising a plurality of the dye-sensitized solar cells of claim 1 disposed, wherein the dye-sensitized solar cells are connected in series and integrated by contacting a first conductive layer of the dye-sensitized solar cell with a second conductive layer of another adjacent dye-sensitized solar cell.

6. The dye-sensitized solar cell module of claim 5, wherein ends of the porous photovoltaic layers of adjacent dye-sensitized solar cells are not parallel.

7. The dye-sensitized solar cell module of claim 5, wherein the porous photovoltaic layer and/or second conductive layer are/is layer(s) formed by using a screen printing process.

8. The dye-sensitized solar cell module of claim 5, wherein the dye-sensitized solar cell has a porous insulating layer between the porous photovoltaic layer and the second conductive layer.

9. The dye-sensitized solar cell module of claim 8, wherein the porous insulating layer is a layer formed by using a screen printing process.

10. The dye-sensitized solar cell module of claim 8, wherein the porous photovoltaic layer, the porous insulating layer and the second conductive layer are layers formed by laminating precursor layers thereof and then simultaneously sintering precursor layers.

11. The dye-sensitized solar cell of claim 1, further comprising a porous insulating layer in wherein the carrier transport layer is formed.

12. The dye-sensitized solar cell of claim 11, wherein a portion of the porous insulating layer is in physical contact with a portion of the first conductive layer.

13. The dye-sensitized solar cell of claim 1, wherein the length of the contact side of the porous photovoltaic layer is longer than that its confronted side.

14. The dye-sensitized solar cell of claim 1, wherein no portion of the inclined plane of the porous photovoltaic layer is vertical.

15. A dye-sensitized solar cell, comprising:
a first conductive layer;
a porous photovoltaic layer formed on the first conductive layer, the porous photovoltaic layer containing a dye;
a porous insulating layer in which a carrier transport layer is formed, the porous insulating layer formed on the porous photovoltaic layer; and
a second conductive layer formed on the porous insulating layer, wherein the porous photovoltaic layer includes a transition portion at an edge thereof in which a thickness of the porous photovoltaic layer varies from substantially zero to a maximum and a constant portion extending from the transition portion in which the thickness of the porous photovoltaic layer is substantially constant, wherein the thickness of the porous photovoltaic layer substantially satisfies a condition in which a dimensionless number K represented by the following formula:

$$K=Y/\sqrt{X^2+Y^2},$$

is less than or equal to a predetermined value, wherein the predetermined value is 0.15,
where X is a lateral length of the transition portion, and
where Y is the thickness of the porous photovoltaic layer of the constant portion.

16. The dye-sensitized solar cell of claim 15, wherein a length of a contact side of the porous photovoltaic layer adjacent to the first conductive layer is different from a confronted side of the porous photovoltaic layer adjacent to the porous insulating layer.

17. The dye-sensitized solar cell of claim 16, wherein the length of the contact side of the porous photovoltaic layer is longer than the confronted side.

18. A dye-sensitized solar cell module, comprising:
a plurality of the dye-sensitized solar cells of claim 15;
a first support on which the first conductive layers of the plurality of the dye-sensitized solar cells are formed; and
a second support formed on the second conductive layers of the plurality of the dye-sensitized solar cells are formed, wherein the plurality of dye-sensitized solar cells are connected in series by forming an electrical contact between the first conductive layer of one dye-sensitized solar cell with the second conductive layer of another dye-sensitized solar cell adjacent to the one dye-sensitized solar cell.

19. The dye-sensitized solar cell module of claim 18, further comprising:
a plurality of insulating layers formed between adjacent dye-sensitized solar cells,
wherein at least one insulating layer is enclosed within a space defined by adjacent dye-sensitized solar cells and the second support.

20. The dye-sensitized solar cell of claim 15, wherein in the transition portion, a total change in the thickness of the photovoltaic layer is less than the lateral length of the transition portion.

21. The dye-sensitized solar cell of claim 1, wherein a difference between a length of the contact side and a length of its confronted side is 100 to 800 μm.

22. The dye-sensitized solar cell of claim 2, wherein a difference between a length of the contact side and a length of its confronted side is 100 to 800 μm.

23. The dye-sensitized solar cell of claim 15, wherein a difference between a length of the contact side and a length of its confronted side is 100 to 800 μm.

* * * * *